United States Patent
Whiley et al.

(10) Patent No.: US 8,262,360 B2
(45) Date of Patent: Sep. 11, 2012

(54) WIND TURBINE ROTOR

(75) Inventors: David Anthony Whiley, Shrewsbury (GB); Paul Trevor Hayden, Cowes (GB)

(73) Assignee: Blade Dynamics Limited, Isle of Wight (GB)

( * ) Notice: Subject to any disclaimer, the term of this patent is extended or adjusted under 35 U.S.C. 154(b) by 756 days.

(21) Appl. No.: 12/259,971

(22) Filed: Oct. 28, 2008

(65) Prior Publication Data

US 2010/0086409 A1   Apr. 8, 2010

(30) Foreign Application Priority Data

Oct. 8, 2008   (GB) .................................. 0818466.5

(51) Int. Cl.
*B63H 1/20*   (2006.01)
*B63H 13/00*   (2006.01)

(52) U.S. Cl. .................................. 416/219 R; 416/220 R (58) Field of Classification Search .............. 416/219 R, 416/220 R
See application file for complete search history.

(56) References Cited

U.S. PATENT DOCUMENTS

| | | | |
|---|---|---|---|
| 3,091,383 A * | 5/1963 | Stalker | 416/220 R |
| 3,396,905 A * | 8/1968 | Johnson | 415/119 |
| 4,029,434 A | 6/1977 | Kenney | |
| 4,140,435 A | 2/1979 | Huber | |
| 4,183,715 A | 1/1980 | Ducker | |
| 4,260,332 A * | 4/1981 | Weingart et al. | 416/226 |
| 4,668,109 A | 5/1987 | Basso | |
| 4,728,263 A | 3/1988 | Basso | |
| 5,213,470 A | 5/1993 | Lundquist | |
| 6,951,443 B1 | 10/2005 | Blakemore | |
| 7,381,029 B2 * | 6/2008 | Moroz | 416/132 B |
| 7,470,114 B2 * | 12/2008 | Bonnet | 416/226 |
| 7,581,926 B1 * | 9/2009 | Dehlsen et al. | 416/87 |
| 2009/0162208 A1 * | 6/2009 | Zirin et al. | 416/226 |
| 2010/0260611 A1 * | 10/2010 | Rudling | 416/226 |

FOREIGN PATENT DOCUMENTS

| | | |
|---|---|---|
| DE | 1270411 | 6/1968 |
| GB | 2210420 | 6/1989 |
| WO | WO 2007/135391 | 11/2007 |
| WO | WO 2009/034292 | 3/2009 |

OTHER PUBLICATIONS

GB Search Report for GB0818466.5 dated Feb. 9, 2009.
PCT International Search Report dated Jan. 14, 2011, International Application No. PCT/GB2009/002401.

* cited by examiner

*Primary Examiner* — Nitin Parekh
(74) *Attorney, Agent, or Firm* — Patterson & Sheridan, LLP (57) ABSTRACT

A wind turbine rotor comprising a hub and a plurality of blades. The hub comprises a plurality of sites, each having a pair of spaced apart annular bearings for receiving a respective wind turbine blade. Each blade has a spar extending along a substantial portion of the length of the blade and protrudes from the proximal end of the blade. The spar protrudes into and is rotatably received within the respective spaced apart bearings and is fixed to the hub.

13 Claims, 10 Drawing Sheets

WIND TURBINE ROTOR

CROSS-REFERENCE TO RELATED APPLICATIONS

This application claims benefit of British patent application number 0818466.5, filed Oct. 8, 2008, which is herein incorporated by reference.

BACKGROUND OF THE INVENTION

1. Field of the Invention

The present invention relates to a hub for a wind turbine.

2. Description of the Related Art

Current large-scale horizontal axis wind turbines have tower head weights (including the rotor, nacelle and drive train) of the order of 120 to 200 metric tonnes. There is an increasing trend for larger diameter turbines and the weight of the tower head is increasing approximately as the cube of the diameter of the turbine. The rotor itself (made up of the hub and blades) accounts for roughly 30% of the tower head weight. Approximately 60% of this is attributed to the blades while 40% is attributable to the hub.

U.S. Pat. No. 4,029,434 discloses the blade mounting for a windmill. The root of the blade extends into the hub where it is supported by a journal bearing assembly and a combined journal and thrust bearing assembly which allow the blade to rotate about its axis. The combined journal and thrust bearing assembly must be built around the root once the root is in situ. Further, the blade root bears directly against the two bearings and therefore must have a circular cross section. The mounting is suitable for a windmill in the 1970s (which would have had a rotor diameter of less than 20 m), but is not suitable for a modern day wind turbine blade, the blade length of which could be in order of magnitude greater than the blade contemplated by U.S. Pat. No. 4,029,434.

U.S. Pat. No. 4,668,109 discloses a bearing assembly for a wind turbine. The bearing is a sealed unit which has an outer cylinder which is bolted to the hub by an array of bolts. Within the cylinder is a shaft which is supported on a pair of bearings. A wind turbine blade terminates in a flange which is bolted by an array of bolts to a flange which is integral with the shaft. The bearing has an expansive pressure ring which is arranged to apply equal compressive force to the bearings so that the pressure is maintained as the bearing wears. The bearing is designed to be suitable for a small scale wind turbine. The manner in which the bearing is connected makes it unsuitable for a modern day large wind turbine. In particular, the requirement for two arrays of bolted joints, one at either end of the bearing would make the joint too heavy to be scaled up to the size required for a modern day turbine. Its use in a modern large scale wind turbine blade would only make the problems referred to below with regard to the plurality of bolts worse.

Figure 1:
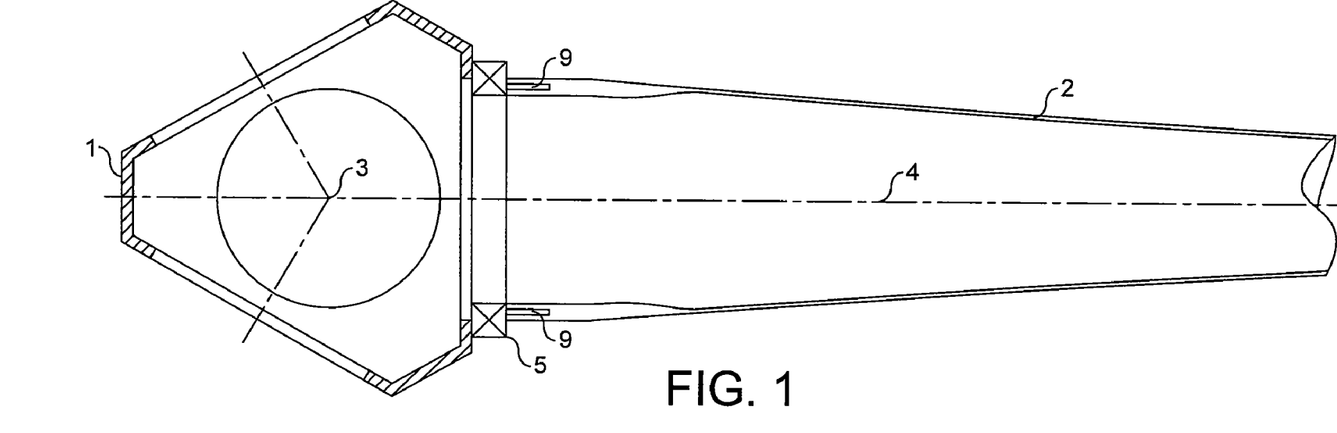
FIG. 1 is a schematic cross-section of a prior art rotor.
Figure 2:
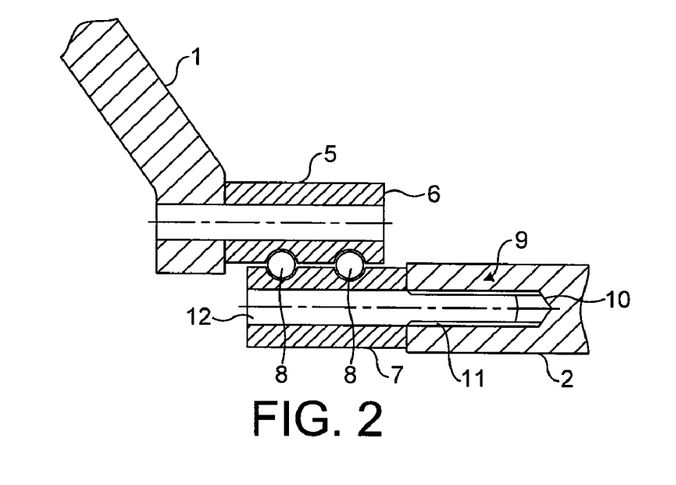
FIG. 2 is a cross-section through the part labelled as 11 in FIG. 1.
Figure 3:
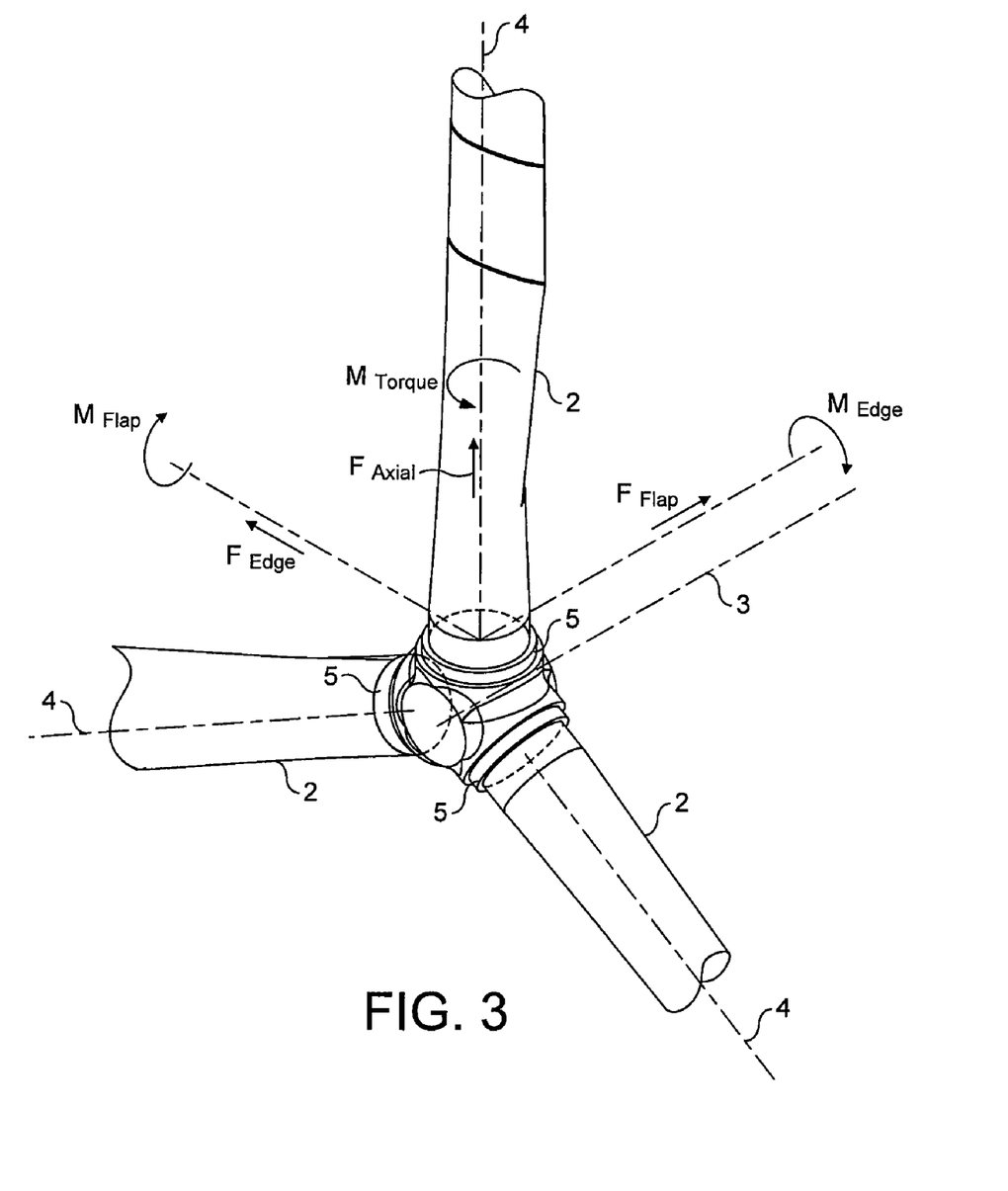
FIG. 3 is a schematic perspective of a rotor showing the various loads on the rotor.

The current design of a conventional wind turbine rotor is shown in FIGS. 1 to 3. The rotor comprises a hub 1 which is a large, heavy and typically cast metallic structure. Three blades 2 are attached to the hub, one of which is shown in FIG. 1. The hub has a rotor axis 3 about which the rotor rotates and the blades are rotatably mounted so as to be rotatable about a pitch axis 4 each driven by a pitch motor (not shown). For each blade, the hub is provided with an annular pitch bearing 5 which supports the blade 2 so as to allow it to rotate about the pitch axis. The pitch bearing typically has an outer race 6 and an inner race 7 with a pair of ball sets 8 inbetween.

Current art large wind turbines use two types of general blade design, those with a structural spar bonded inside an aerodynamic shell and those with the stiffening structure within the aerodynamic shell. In both cases the main structural elements of each blade are terminated at the hub end in what is known as a root structure. This is the last piece of blade structure (typically 3-8 m in length) at the proximal end of the blade. This root structure takes all of the bending loads out of the blade and into a cylindrical shape ready for transfer to the hub via the pitch bearing.

The root end of the blade has a number of bolt attachment points 9 (typically 60 to 80) around the circumference of the root. These take the form of holes 10 into which threaded steel inserts 11 are bonded. A plurality of bolts 12 are inserted through the inner race 7 and into the inserts 11 to hold the blade 2 in place.

The current design has a number of shortcomings.

The rotor mass is significant both in terms of the load on the drive train and also the tower head mass. This has a significant effect, particularly for large turbines, on the dynamic interaction between the rotor and the tower. For off-shore installations, a large tower head mass is one of the significant problems with cost-effective deployment of the technology in this environment.

The inserts 11 are very difficult to produce with a high degree of repeatability. These are one of the most highly loaded points on the blade structure yet this relies on a number of secondary bonds where very high performance adhesive is used to bond the metallic studs to the composite root component.

In addition, the inserts are typically metallic and can cause problems due to differences in thermal expansion coefficient relative to the composite root structure, as well as difficulties in bond adhesion to the steel insert. Additionally, thicker sections of composite are needed at the root end of the blade to reduce flexural mismatch with the metallic inserts. This leads to the root end of the blade being heavy.

The pitch bearing also has to take the full flapwise ($M_{Flap}$ in FIG. 3) and edgewise ($M_{Edge}$) bending moments of the blade. It also has to take the axial load ($F_{Axial}$) caused by centrifugal and gravitational loading as well as radial flapwise ($F_{Flap}$) and edgewise ($F_{Edge}$) loads. This means that the bearings are large diameter, expensive and heavy components in order to be able to cope with the large and varied forces. A number of pitch bearings have failed in use under these loads.

The large diameter required for the pitch bearing for the reasons set out above means that the root end of the blade needs to be made thicker (larger diameter) than is desirable for aerodynamic performance, thereby decreasing the efficiency of the blade.

The assembly of the blade onto the hub requires accurate torquing of a large number of bolts in order to achieve adequate fatigue resistance at the bolts and to avoid distortion of the pitch bearing. This is a time-consuming process which must be carried out with great care if problems are to be avoided.

SUMMARY OF THE INVENTION

The present invention provides an interface between the hub and the wind turbine blades which addresses at least some of the shortcomings set out above.

According to a first aspect of the present invention, there is provided a wind turbine rotor comprising a hub and a plurality of blades, the hub comprising a plurality of sites, each having a pair of spaced apart annular bearings for receiving a respective wind turbine blade, each blade having a spar extending along a substantial portion of the length of the blade and protruding from the proximal end of the blade, the spar protruding into and being rotatably received within the respective spaced apart bearings and being fixed to the hub.

Rather than terminate the blade and provide a bulky circular root end, the present invention takes the approach of extending the spar into the hub and supporting the hub and the spar rotatably in a pair of spaced apart bearings.

This means that instead of one large bearing taking the full bending moment of the blade perpendicular to the plane of rotation, there are now two smaller bearings taking the bending moment out of the blade within the plane of rotation of each bearing. Not only does this provide a load situation which is more suitable for a bearing (in plane of bearing rotation as opposed to perpendicular to plane of bearing rotation) but also allows the loads on each bearing to be further reduced by increasing the separation of the bearings. Therefore the load on each bearing is reduced and is in a direction that the bearing is more able to support, leading to a smaller and more reliable bearing arrangement. Ultimately this leads to reduced bearing cost and increased reliability when compared to the prior art. It also allows the means by which the blade is fixed to the hub to be simplified reducing or eliminating the need for a thick root end to accommodate the array of bolts.

Preferably, the spacing between bearings is at least 1 m and more preferably at least 1.5 m. Preferably, the rotor has a rotor diameter (i.e. the diameter of the circle swept by the blades) of at least 45 m.

The blade may still be connected to the hub using the bonded insert and bolt connection of the prior art. In view of the additional support provided by the bearings referred to above, the size of the hub connection could be reduced to some extent, thereby leading to some benefits. However, preferably, each spar is fixed to the hub at a location radially inwards of the distal end of the distal bearing.

By contrast, in the conventional design, the blade abuts against the distal end of the bearing such that there is no overlap. As soon as the blade begins to overlap with the bearings, the bending loads on the blade begin to reduce as they are taken up by the bearings. This facilitates the fixing of the blade to the hub as whatever fixing is used is required to bear less load.

Preferably, each spar is fixed to the hub at a location radially inwards of the proximal end of the proximal bearing. This maximises the advantage referred to above as, beyond the proximal end of the proximal bearing, the bending moments on the blade have reduced to zero. The fixing between the blade and the hub is then only required to support the axial force on the blade (FAxial) caused by the gravitational and centrifugal loading. This fixing can therefore be greatly simplified as compared to the multiple bolts and steel inserts of the prior art.

Preferably, the blade is supported by a pin inserted through a hole in the blade proximally of the proximal bearing, the pin abutting against a proximal face of the proximal bearing to support the axial loads.

The rotor hub can be made predominantly from composite material. The only metallic pieces may be the pitch bearings and the bearings and supports for the rotor shaft attachment. The section of hub the between the two bearings essentially replaces what was the 'root structure' of PCT/GB2008/002571. In this section the root has predominantly more unidirectional material on the faces which are taking the highest blade loads (typically the flapwise parts) and predominantly more multiaxial material on the faces which are taking the highest shear loads (typically the edgewise parts). This variation in the laminate structure can be replicated in this section of the hub allowing for optimal use and orientation of different fibre types and arrangements and this is now a preferred route in this case. Also, the need for metallic inserts can be avoided by moving the fixing proximally of the bearings, thereby removing the need make the blade thicker at the root end. These considerations alone provide a reduction of around 25% of the hub and root mass.

Preferably, the spar and bearings are configured to allow each blade to be slid into and out of the hub along the respective axis of rotation of the blade. This provides a simple way of assembling the blades to the hub.

The present invention also extends to a method of assembling a wind turbine according to the first aspect of the invention, the method comprising assembling the hub with the pair of annular bearings at each site; inserting the spar of each blade into its respective pair of annular bearings; and fixing each blade to the hub.

The method is an improvement on the prior art as it allows for a much simpler fixing between the blade and the hub, particularly if the spar is fixed to the hub radially inwards of the proximal end of the proximal bearing and ideally using the pin.

The method also offers the possibility of fixing a hub to a wind turbine tower and subsequently assembling the wind turbine according to the above method. At present, the fully assembled rotor is lifted onto the tower. This is a complex process using very expensive cranes to move a heavy, physically large and reasonably delicate component into place. If the hub can be put in place before the blades are attached, it is a much simpler task to lift the individual blades into place either using a more basic crane, or a winch at the top of the tower.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Throughout this specification, the term distal refers to a part towards the radially outermost edge of the rotor (i.e., towards the tips of the blade), while the term proximal refers to the radially innermost part of the rotor (i.e., towards the centre of the hub).

The various forces acting on the blade are shown in FIG. 3 which is described in the introduction and will therefore not repeated here.

Figures 4, 4A, 4B, 4C:
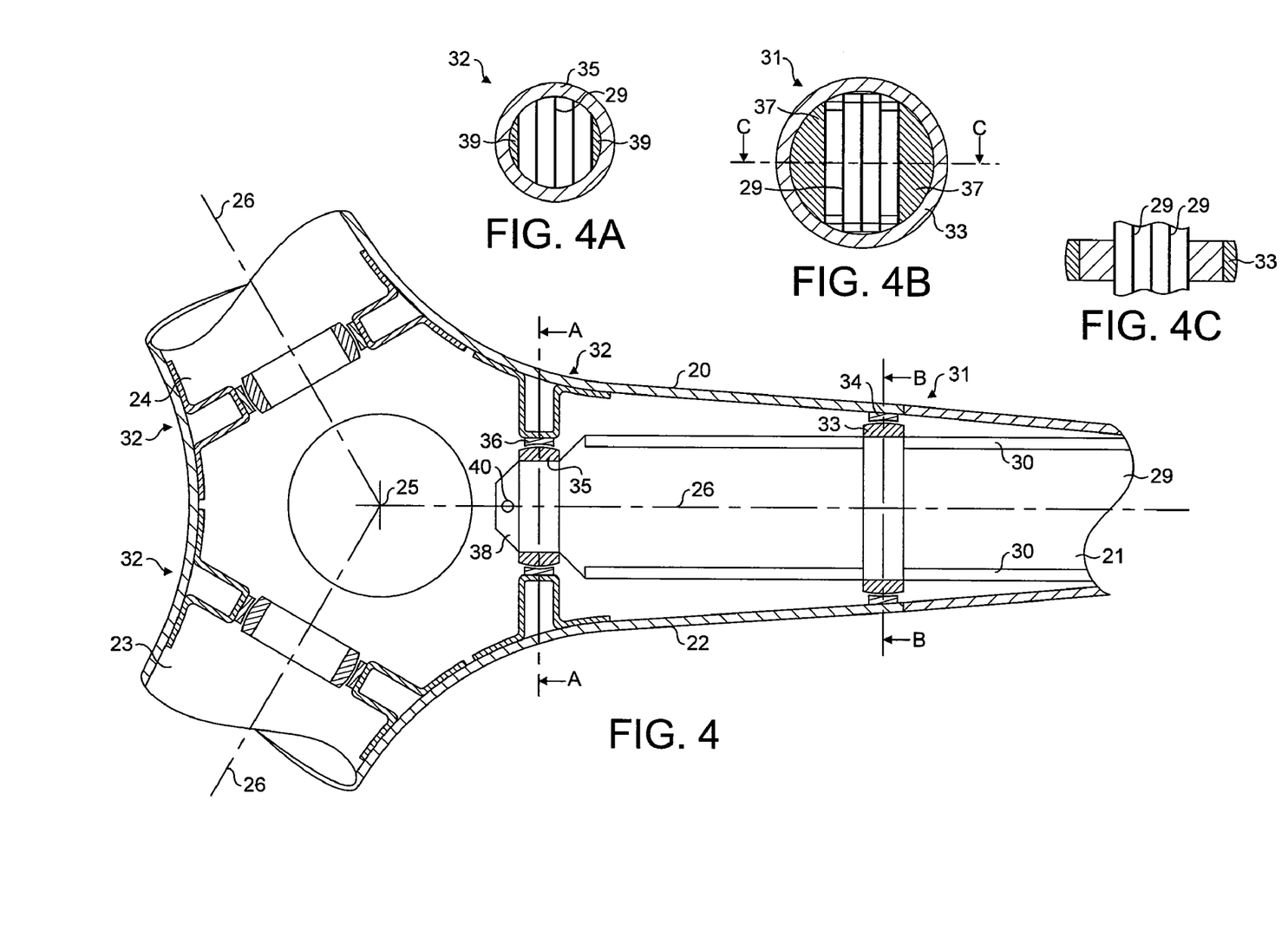
FIG. 4 is a cross-section through a rotor of a first example in a plane perpendicular to the axis of rotation of the rotor.
FIGS. 4A-4C are cross-sections of the blade through lines A-A, B-B and C-C respectively.

The rotor comprises a hub 20 to which three blades 21 (only one of which is shown in FIG. 4) are attached. The blade is shown is attached in a first port 22 and it will be readily understood that the two remaining blades are attached in identical fashion at remaining ports 23, 24.

The rotor is rotatable about the main axis 25. Each of the blades is rotatable about a pitch axis 26 by a respective pitch motor (not shown) in order to optimise the angle of the blade for the prevailing wind conditions.

Figure 5:
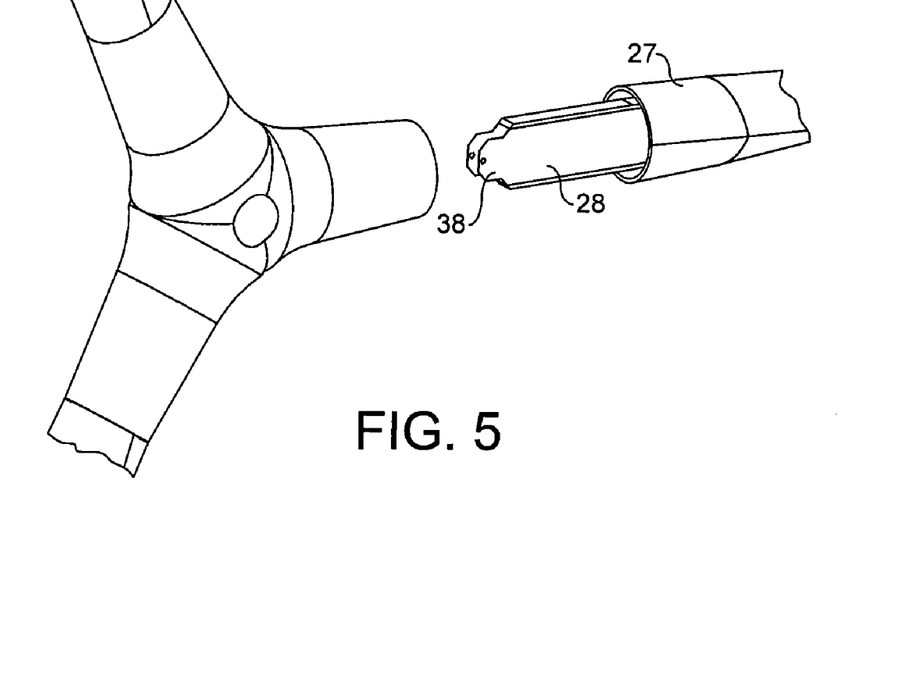
FIG. 5 is a perspective view of the hub and blade prior to insertion of a blade into the hub.
Figure 6:
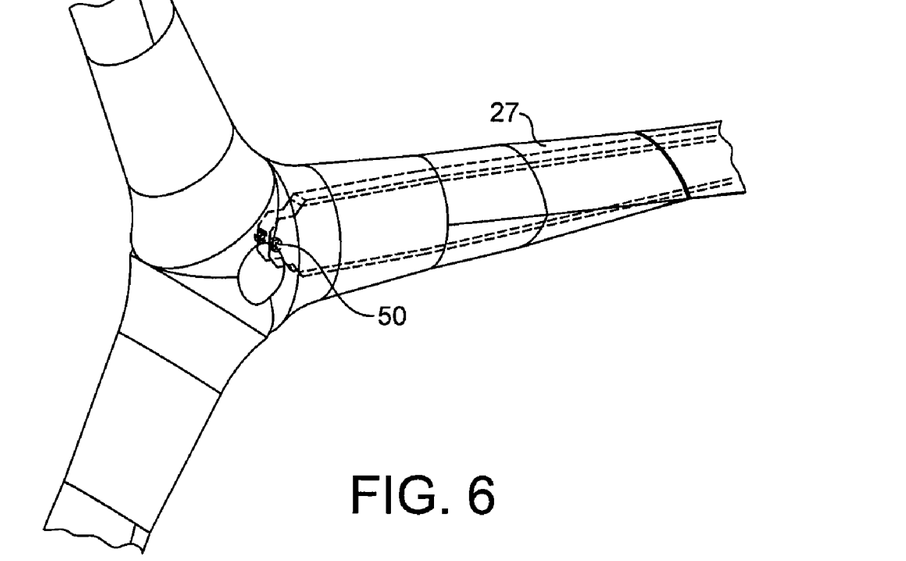
FIG. 6 is a view similar to FIG. 5 showing the blade inserted into the hub.

Each blade comprises an outer shell 27 which extends to the tip of the blade in order to form the outer profile of the blade. A spar 28, as best shown in FIG. 5 extends substantially to the tip of the blade and protrudes from the proximal end of the shell 27.

The cross-sectional structure of the spar may be of any type known in the art. However, preferably, the spar is assembled from a plurality of beams (in this case four) arranged side-by-side as shown in FIGS. 4A-4C. In this case, each of the beams is a box beam comprising a pair of shear webs 29 of multiaxial material with a spar cap 30 of uniaxial material at the top and bottom ends. Core material may be inserted between adjacent webs 29 at certain locations if this is necessary to prevent buckling.

Figures 7, 7A, 7B, 7C, 7D, 7E:
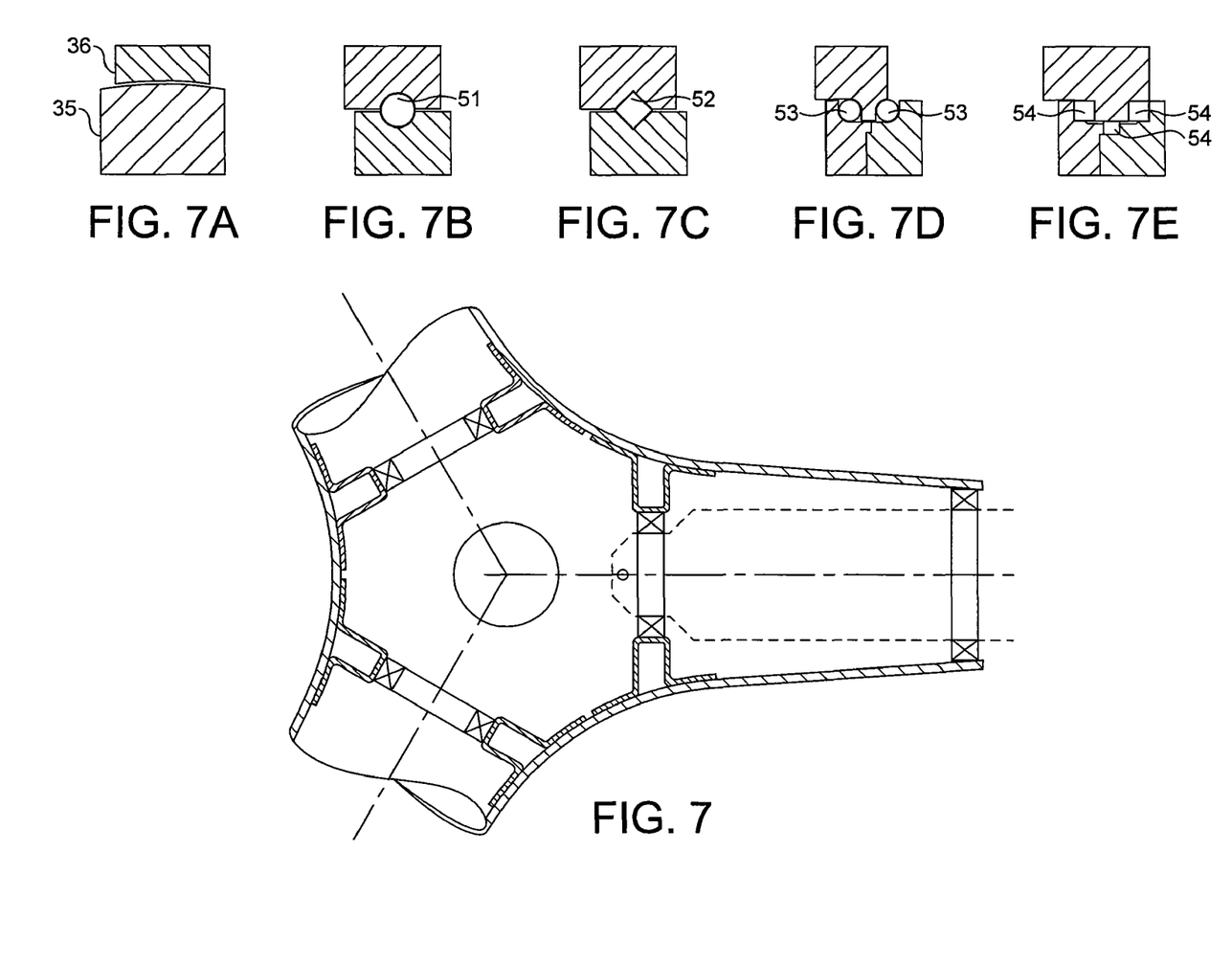
FIG. 7 is a view similar to FIG. 4 showing various bearing types.

Each port within the hub is provided with a pair of bearings, namely an outer bearing 31 and an inner bearing 32. The outer bearing 31 has an inner race 33 and an outer race 34 while the inner bearing 32 has an inner race 35 and an outer race 36. A number of different bearing configurations are shown in FIG. 7. The bearing may be a spherical bearing shown in FIG. 7A which has only sliding contact between the two races. There may be a single ball race 51 (FIG. 7B) or a single roller race 52 in which the rollers are cylindrical and are orientated approximated 45o to the axis 26 (FIG. 7C). Alternatively, there may be a pair of ball races 53 (FIG. 7D) or three races of rollers 54 arranged their axes parallel to axis 26 (FIG. 7E). Other known bearing configurations may also be used.

The outer bearing 31 is provided with a pair of bearing ribs 37 which are dimensioned so as to abut with the inner surface of the inner race 33 and also with the radially outermost surfaces of the spar 28 to firmly support the spar 28 within the inner race 33.

The spar 28 has a reduced cross-sectional area 38 at its distal end and the diameter of the inner bearing is correspondingly smaller as is apparent from FIG. 4. Also, at this point, the spar cap 30 has terminated and the upper end of the edges of the shear webs 29 fit closely with the inner wall of inner race 35 as shown in FIG. 4A. In a similar manner to the outer bearing 31, the inner bearing 32 also has a pair of bearing ribs 39 which provide a tight fit with the spar 28 but are considerably smaller than the bearing webs 37 of the outer bearing. The spar 28 projects proximally of the inner bearing 32 and is provided an aperture 40 which receives a retaining pin 50. The pin is a friction fit, but could be secured in other ways. In order to allow the blade to be removed the pin may be a radially expanding bolt. The retaining pin 50 has a diameter of 50 mm to 60 mm and is long enough to project at least behind the pair of bearing ribs 39 and preferably also behind the inner race 35.

Figures 8, 8A, 8B:
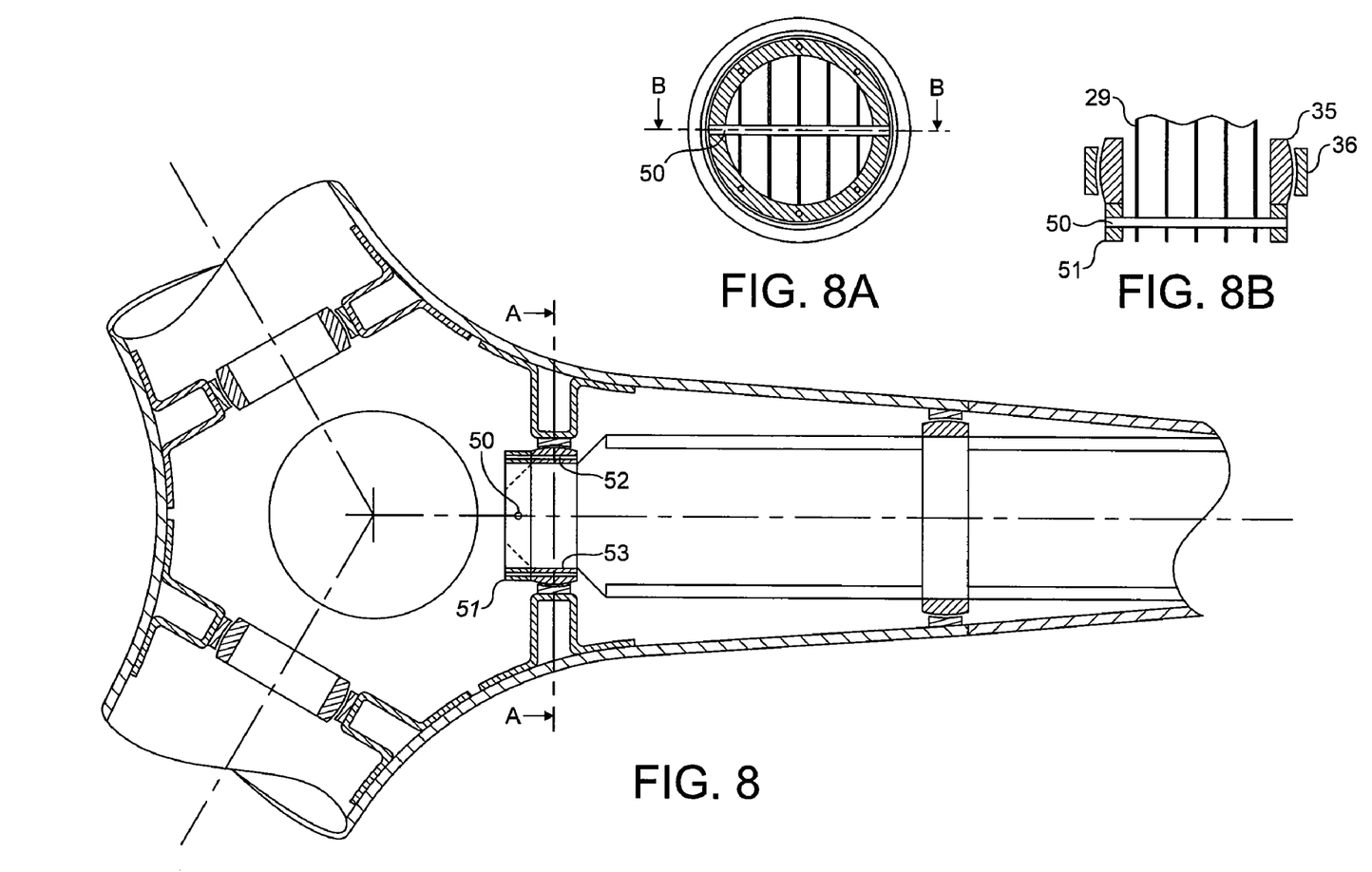
FIG. 8 is a view similar to FIG. 4 showing a first pin connection.

An alternative mounting of the retaining pin 50 is shown in greater detail in FIG. 8.

In this example, a bearing collar 51 is pinned to the inner race by a plurality of pins 52 to project proximally of the inner race. As shown in Section A-A and B-B the pin 50 passes through the full width of the spar 28 via holes in the shear webs 29 and is supported at either end in the bearing collar. Thus, the load is transferred from the spar, via the pin 50, then to the inner race 35 by a combination of the abutment with the bearing collar 51 and the load transmitted by the pins 52. The load is then supported in the hub via any bearing rollers/balls if present to the outer race 36. It should be noted that it has always been necessary to support the blade on the bearings, for example, as shown in FIG. 2. However, loading requirements on each bearing can be greatly reduced by providing two separate bearings and by reducing the total loads supported by the bearings.

Of the loads shown in FIG. 3, the axial load FAxial is borne by the pin bearing against the proximal end of the inner bearing. Only the radial bearing load MTorque is borne by the bearings, and even then, this is split between the inner and outer bearings. As the bearings are spaced apart, they are able to take out the bending moments on the blade itself ($M_{Flap}$) and ($M_{Edge}$). These bending moments and the shear loads $F_{Edge}$ and $F_{Flap}$ are transmitted to the bearings only as radial loads and can therefore be supported by the bearing ribs and inner races. This compares very favourably with the significant out-of-plane loads applied to the large pitch bearing in a conventional hub.

Figures 9, 9A, 9B, 9C, 9D:
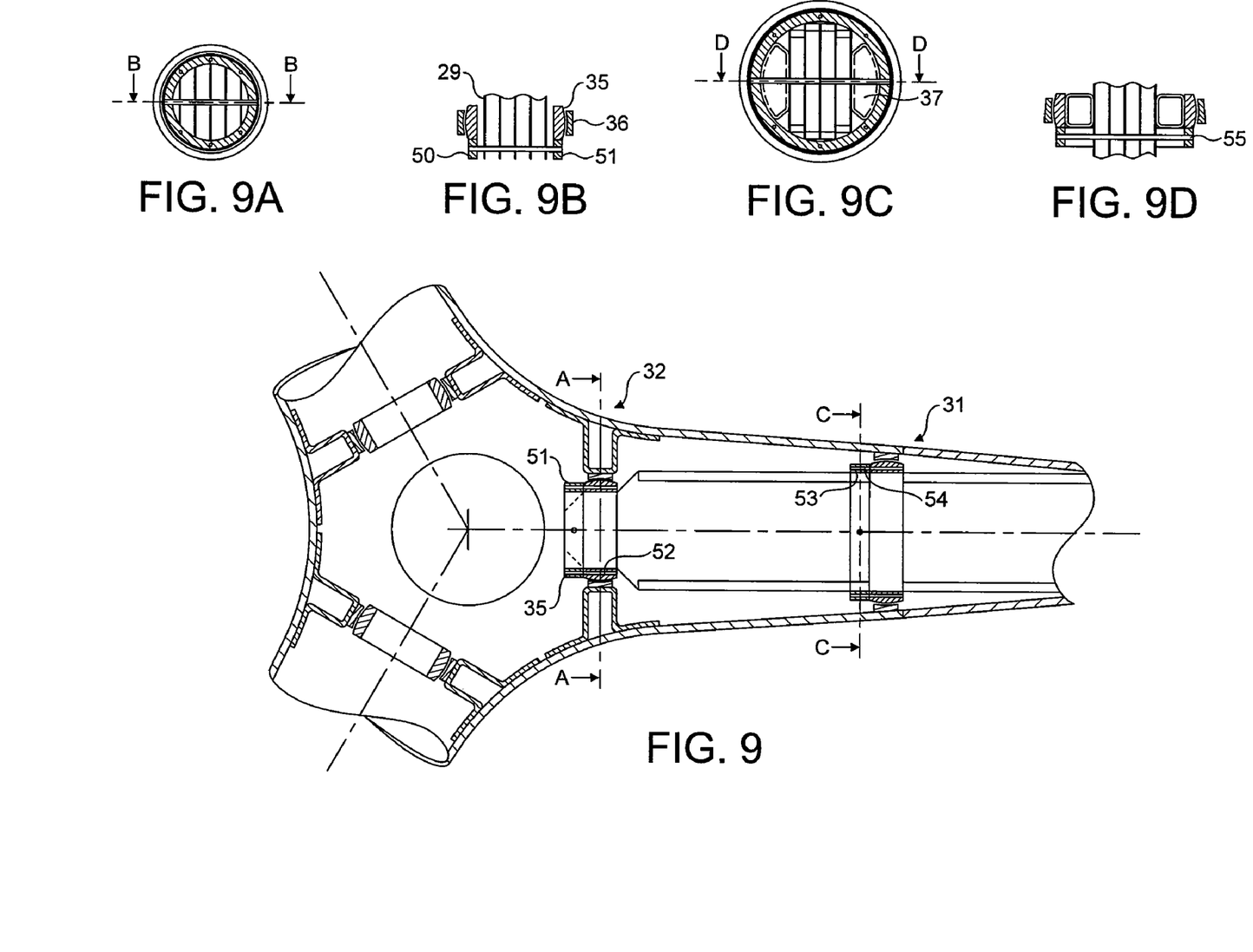
FIG. 9 is a view similar to FIG. 4 showing a second pin connection.

A second pin connection configuration is shown in FIG. 9. This is similar to that of FIG. 8, except that a second bearing collar 53 is attached to the proximal end of the other bearing 31 via a plurality of pins 54 as shown in Section C-C and D-D. The pin connection to the outer bearing 31 is similar to the connection for the inner bearing 32. In this case, the pin 55 also passes through the bearing ribs 37. By supporting the load on two pins 50, 55, the axial load transmitted to each bearing is reduced.

Figure 10:
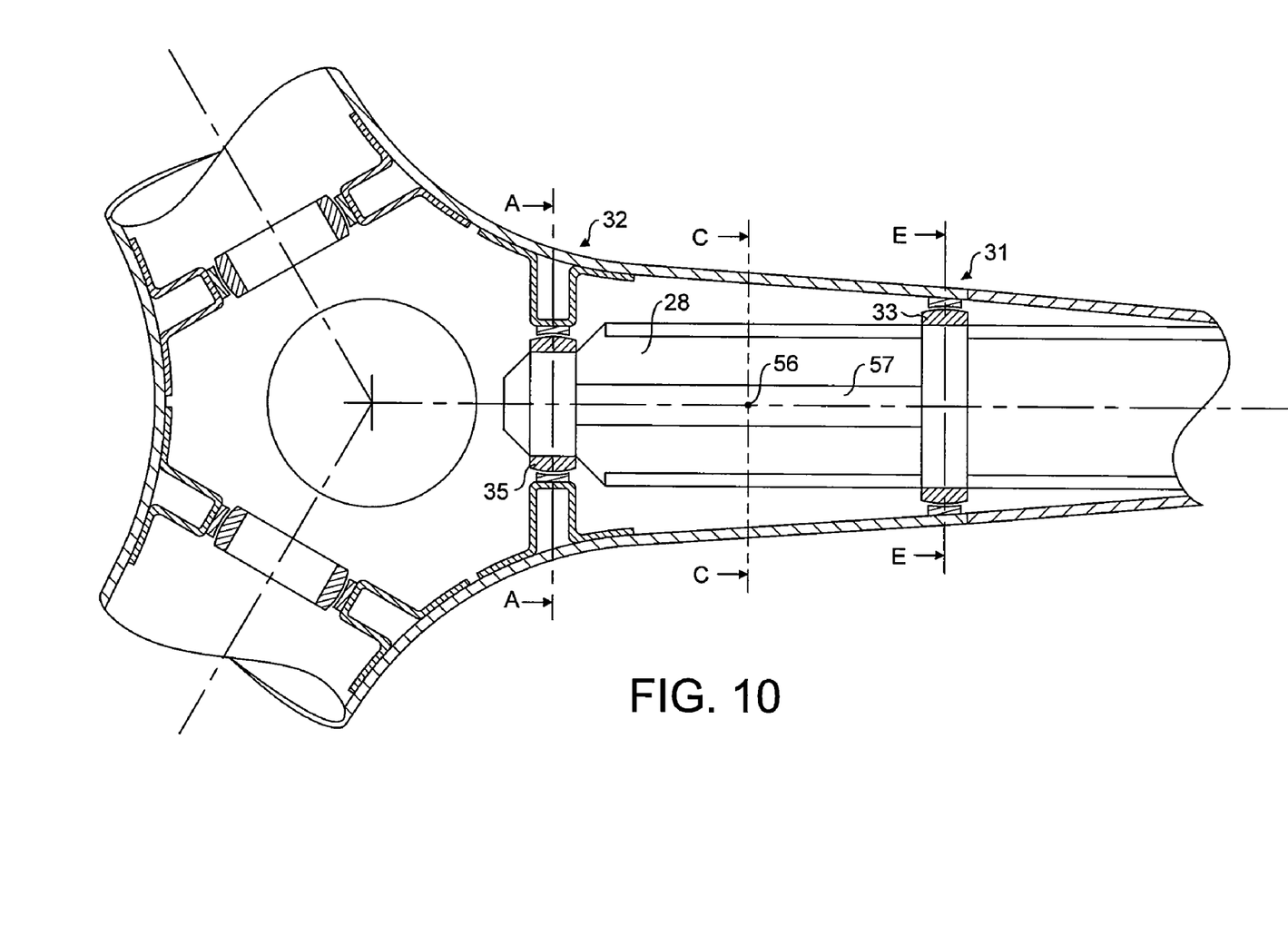
FIG. 10 is a view similar to FIG. 4 showing a third pin connection.
Figure 10A:
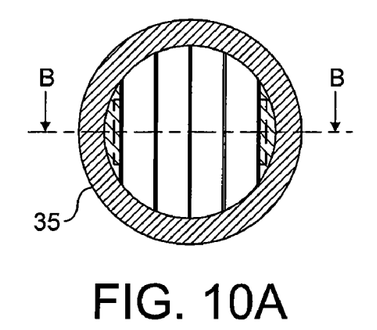
Figure 10B:
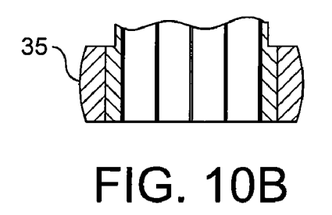
Figure 10C:
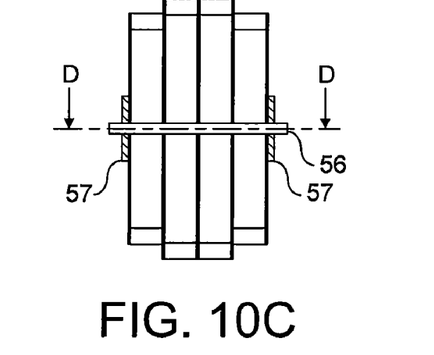
Figure 10D:
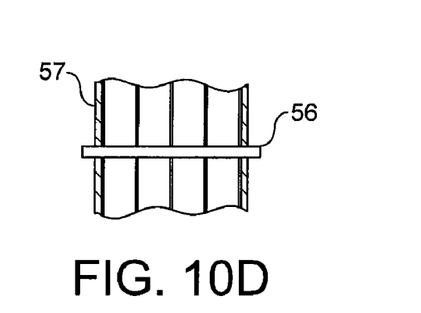
Figure 10E:
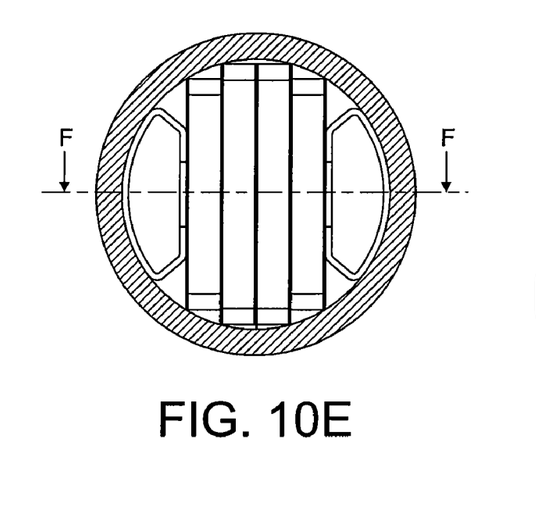
Figure 10F:
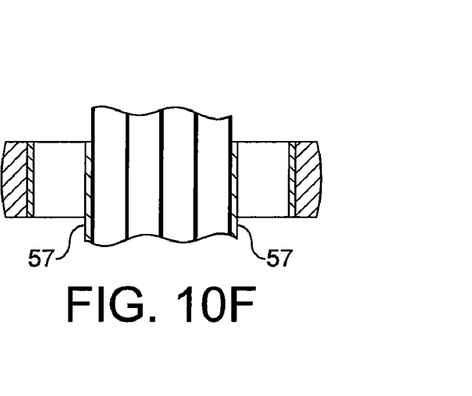

A third configuration of pin connection is shown in FIG. 10. In this case, a single retaining pin 56 is provided mid-way between the two bearings 31, 32. A pair of axially extending bearing links 57 extend along the spar 28 between the two bearings 31, 32 so as to transmit the axial loads to the inner races 33, 35 of the two bearings. Within each bearing, the link 57 abuts against the bearing rib 37, 39 by transmitting the load to the inner races. The bearing rib and bearing link may be integral with one another as shown, or may be separate components.

Figure 11:
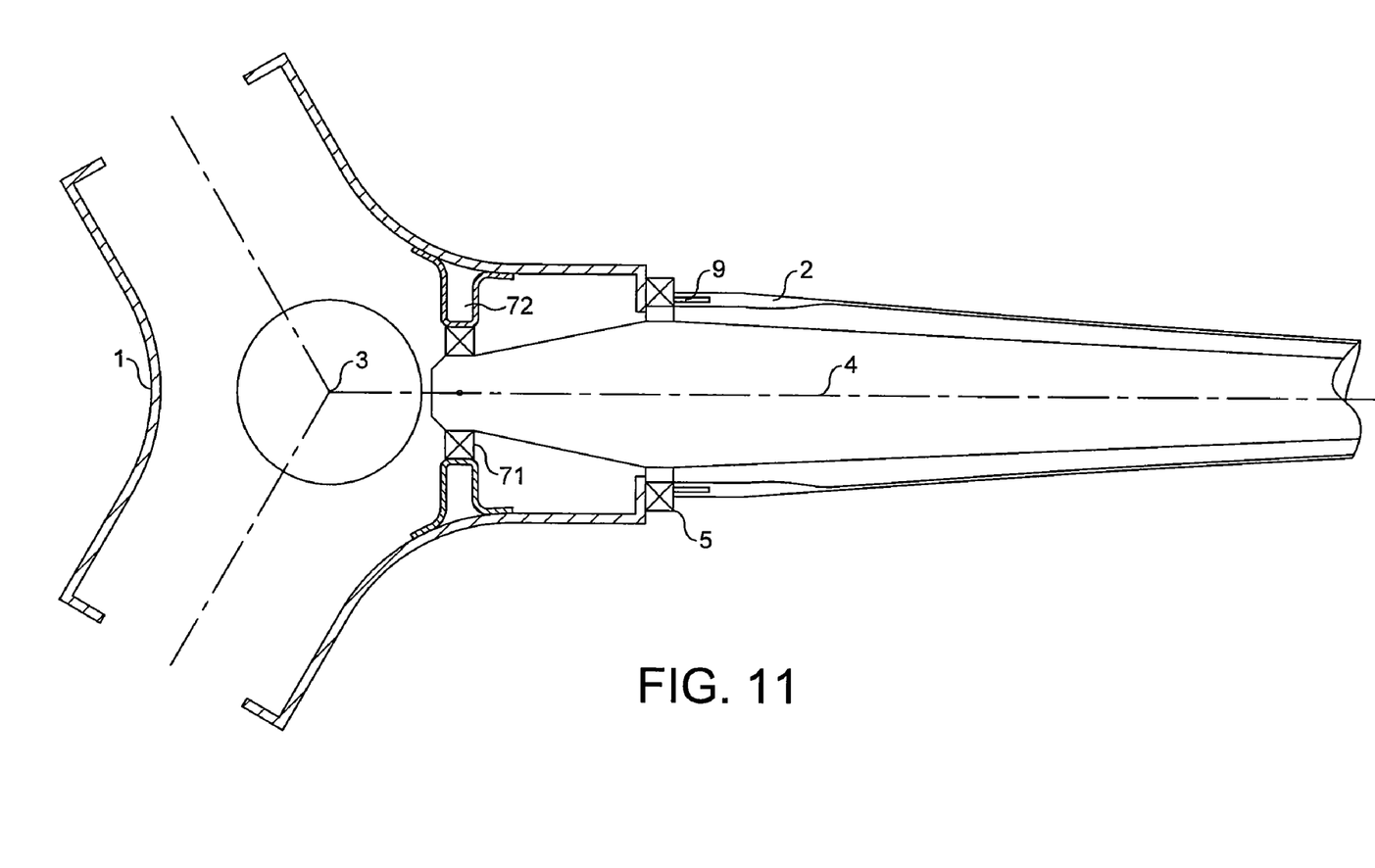
FIG. 11 is a view similar to FIG. 4 showing a second example of a rotor and blade.

FIG. 11 shows a second example of a rotor and blade configuration. This example most closely resembles the prior art arrangement shown in FIG. 1 and the same reference numerals have been used to designate the same components. In this case, the distal bearing 5 corresponds to the annular pitch bearing 5 of the prior art. However, rather than terminating at this point, a spar 70 which projects from the distal end of the blade 2 extends into the hub and into an inner bearing 71 supported on an annular boss 72 within the hub. The blade 2 may be connected to the hub 1 simply through the distal bearing 5 in a conventional manner. Alternatively, it may additionally be connected at the distal bearing 71, for example, using a pin as described above. Indeed, any of the pin joints disclosed above may be used.

Even if there is no additional support for the blade 2 beyond that provided by the conventional pitch bearing 5, the loads on this bearing are still reduced by virtue of the additional support provided to the blade by the inner bearing 71. If the spar 4 has some additional fixing, this further reduces the load on the outer bearing.

While the foregoing is directed to embodiments of the present invention, other and further embodiments of the invention may be devised without departing from the basic scope thereof, and the scope thereof is determined by the claims that follow.

The invention claimed is:

1. A wind turbine rotor comprising a hub and a plurality of blades, the hub comprising a plurality of sites, each having a pair of spaced apart annular bearings for receiving a respective wind turbine blade, each blade having a spar extending along a substantial portion of the length of the blade and protruding from a proximal end of the blade, the spar protruding into and being rotatably received within the respective spaced apart bearings and being fixed to the hub.

2. A rotor as claimed in claim 1 wherein the hub is predominantly made from fibre reinforced plastic materials.

3. A rotor according to claim 1, wherein the spacing between bearings is at least 1 m.

4. A rotor according to claim 3, wherein the spacing between bearings is at least 1.5 m.

5. A rotor according to claim 1, having a rotor diameter of at least 45 m.

6. A rotor as claimed in claim 1, wherein each spar being fixed to the hub at a location radially inwards of a distal end of a distal bearing.

7. A rotor according to claim 6, wherein each spar is fixed to the hub at a location radially inwards of a proximal end of a proximal bearing.

8. A rotor according to claim 7, wherein the blade is supported by a pin inserted through a hole in the blade proximally of the proximal bearing, the pin abutting against a proximal face of the proximal bearing to support the axial loads.

9. A rotor as claimed in claim 1, wherein each bearing comprises an inner race and a complementary outer race within the hub, each spar fitting into the inner race of its two respective bearings so as to rotate together with the inner race.

10. A rotor as claimed in claim 9, wherein each spar has a non-circular cross section which fits into complementary openings in the inner races of the two respective bearings so as to support the spar.

11. A rotor as claimed in claim 1, wherein the spar and bearings are configured to allow each blade to be slid into and out of the hub along the respective axis of rotation of the blade.

12. A method of assembling the wind turbine rotor of claim 1 comprising assembling the hub with the pair of annular bearings at each site; inserting the spar of each blade into its respective pair of annular bearings; and fixing each blade to the hub.

13. A method as claimed in claim 12, wherein the inserting of the spar of each blade into its respective site comprises inserting the spar in the direction of the axis of rotation of the blade.

* * * * *